Jan. 1, 1929.  A. E. FYFE  1,697,178
CRATE COVER CLAMP
Filed March 24, 1927
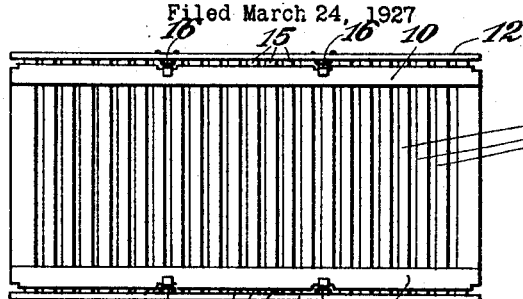
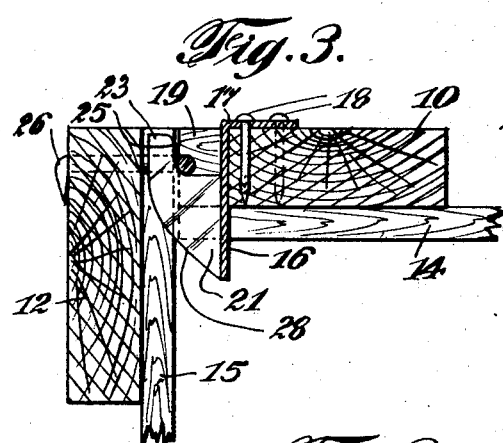
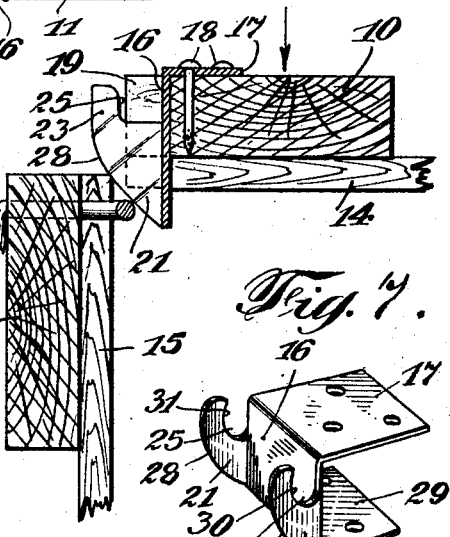
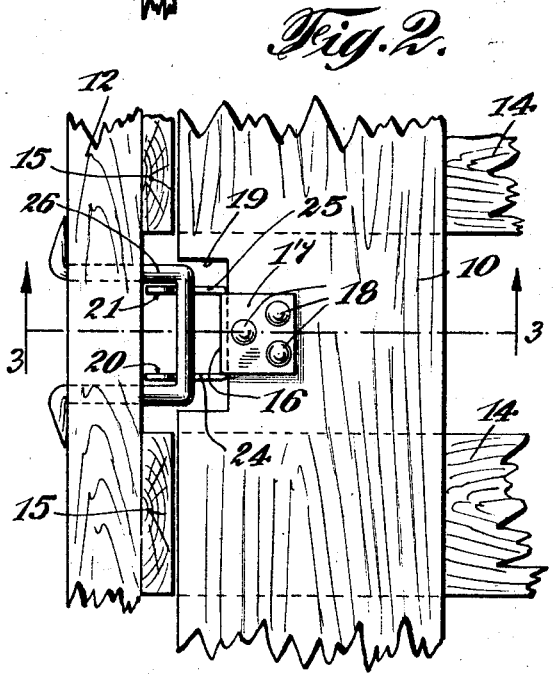
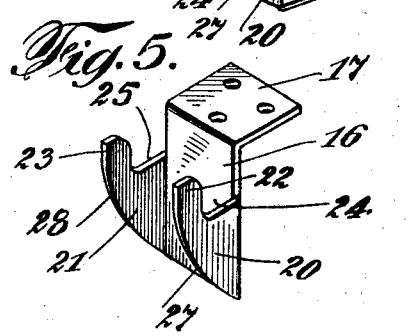
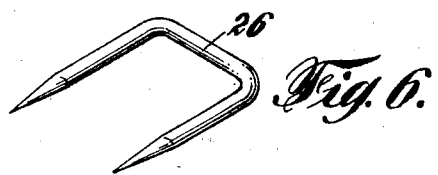
INVENTOR
Albert E. Fyfe
BY
ATTORNEYS Patented Jan. 1, 1929.

1,697,178

UNITED STATES PATENT OFFICE.

ALBERT E. FYFE, OF BROOKLYN, NEW YORK.

CRATE-COVER CLAMP.

Application filed March 24, 1927. Serial No. 177,925.

This invention relates to a crate cover clamp, that is a device by which the cover of a crate when placed in the body thereof is adapted to so function as to automatically secure the cover in position. In carrying out the invention the parts of the clamp are so associated with the cover and one or more of the side members of the body of the crate that when the cover is placed in the body of the crate one part of the clamp coacts with the other part thereof to spring or cause the side of the crate to bulge to permit the parts of the clamp to pass, and thereafter, and upon the return of the side of the crate to position to automatically cause the parts of the clamp to become engaged to secure the cover in its necessary position to properly close the crate.

As constructed in accordance with my invention the clamp comprises a hook member and an eye member adapted to be engaged thereby. The hook member is preferably applied to the cover and the eye member to the side of the crate, although as will be understood this position of these parts may be reversed. The hook member of the clamp may be suitably secured to the cover of the crate and the eye member of the clamp secured in any desired manner to the side of the body of the crate, or vice versa, so as to cooperate in the manner hereinbefore stated to secure the cover in position as will be hereinafter more particularly described.

In the drawing Figure 1 is a plan of a crate fitted with a cover clamp made in accordance with my invention.

Fig. 2 is a partial plan on an enlarged scale showing the parts of a clamp in their associated relationship.

Fig. 3 is a section on line 3—3, Fig. 2.

Fig. 4 is a section similar to Fig. 3, showing the position of the parts assumed before their locking engagement with one another.

Fig. 5 is a perspective view of the hook member of the clamp.

Fig. 6 is a perspective view showing the staple which may form the eye member of the clamp, and Fig. 7 is a perspective view showing a modified form of the hook member of the clamp.

Referring to the drawing it will be seen that the clamp made in accordance with this invention is adapted for use in connection with a crate as usually employed for shipping various classes of merchandise and which is constructed to include a body member and a cover therefor. As illustrated in the drawing, 10 and 11 indicate side rails of the crate cover and 12 and 13 the upper side rails of the crate body. As is customary, slats 14 or their equivalent devices extend between and are secured to the side rails 10 and 11, and similarly the sides of the body member include suitable slats indicated at 15. The cover member at one side may be hinged or other wise connected to a side of the crate, or as illustrated, the clamp devices hereinafter described may be employed for connecting and securing the cover member in position to close the crate.

The clamp members comprising this invention are all similarly constructed, and for this reason but one of them will be described in detail. Each of these clamp members preferably comprises a bracket 16 having a flange 17 turned approximately at right angles thereto at one end thereof and by which through suitable screws or brads 18 the bracket may be secured in position to a side rail of the crate cover. As illustrated, the side rail 10 of the crate cover is notched at 19 and the bracket 16 placed therein with its flange overlying the adjacent portion of the upper surface of the rail so as to be readily secured thereto by means of the screws or brads 18. As shown in the drawing the bracket 16 is formed from sheet metal and includes oppositely disposed lugs 20 and 21 extending from the sides of the bracket and terminated in hooks 22 and 23 respectively by means of the notched portions 24 and 25 which provide sockets for the reception of the cooperating or complementary member of the clamp. As clearly illustrated in the drawing the lateral extent of the lugs 20 and 21 is such as to leave a small but an appreciable space between the outer edges thereof and the adjacent inner edges of the upper side rails of the crate body when the parts are in their associated relationship.

The other member of the clamp may be made by a staple 26 or the equivalent thereof. As illustrated, this staple is passed through the side rail 12 of the crate body and the points thereof turned over against the outer surface of the rail. This however is merely illustrative, as any equivalent structure to form an eye may be employed. The staple as illustrated is so positioned that its cross member is adapted to be engaged by the hook ends 22 and 23 of the lugs of the bracket to secure the crate cover in position in the body of the crate.

By reference to Fig. 7 it will be seen that the hook member of the clamp may be made to include an additional flange 29 to fit the rail or other part of the cover and to be suitably secured thereto so that the connection between the hook member and the rail may be as secure as possible. Furthermore, the lugs 20 and 21 may be so formed that portions of the notches 24 and 25 therein are undercut slightly as indicated at 30 and 31 to prevent the parts of the clamp from accidental separation.

In the use of the device in placing the cover in position the beveled or rounded edges 27 and 28 of the lugs 20 and 21 bear against the outer surface of the eye member as shown in Fig. 4. The crate cover is then forced to position by springing or bulging the side of the crate sufficiently to permit the outer edges of the lugs to pass over and clear the outer surface of the eye member. Thereupon as will be understood, the side member of the crate due to the resiliency thereof automatically returns to its normal position and the contents of the crate will raise the cover sufficiently far to cause the eye member to enter the notch or socket portion of the lugs of the bracket member and to be engaged by the hooks thereof to secure the crate cover in position. Obviously also, in removing the crate cover or in raising the same it will be necessary to first depress the cover and to then spring or deflect the side of the crate body sufficiently far to cause the outer surface of the eye member to clear the outer edges of the lugs of the bracket member of the clamp. As hereinbefore stated, one edge of the crate cover may be hinged or otherwise permanently connected to the crate body or both sides of the cover member may be provided with the clamp devices hereinbefore described, in which event the clamp devices on one side of the cover may be fitted to position and act in substantially the same manner as a permanent hinge in moving the cover of the crate to position in the body thereof. It will also be obvious that the parts of the clamp device may be reversed in position, that is the bracket member secured to the crate body and the eye member to the crate cover without departing from the nature and spirit of the invention, and furthermore, that similar and equivalent structures may be employed to this end. Moreover, it will be understood that while the clamp comprising the present invention is particularly adapted for use in conjunction with knocked-down or collapsible crates, it may be used to advantage in other forms of crates and also in various other forms of receptacles.

I claim as my invention:

1. In a crate having a body and a cover therefor, a crate cover clamp comprising a hook member and an eye member, the said members being so associated with the side of the crate and the crate cover as to co-act with each other when the cover is placed in position to first cause the side of the crate to bulge permitting the said members to pass and to then permit the side of the crate to return to its normal position when the said members interengage by the cooperation of the contents of the crate in order to lock the cover in place.

2. In a crate having a body and a cover therefor, a crate cover clamp comprising a hook connected to the edge of the cover having a notch in the upper edge thereof and also being inclined at the forward edge thereof, and an eye fixed in the side of the crate body adjacent the upper edge thereof, the said hook being adapted when the cover is placed in position to engage the said eye in such a manner that the inclined edge thereof passes over the eye forcing the side of the crate outwardly, the side of the crate returning to its normal position after the hook has passed the eye whereby through the cooperation of the contents of the crate the hook then engages the eye to lock the cover in place.

Signed by me this 8th day of March, 1927.

ALBERT E. FYFE.